United States Patent [19]

Furhmann et al.

[11] Patent Number: 5,766,312
[45] Date of Patent: Jun. 16, 1998

[54] ADSORBENTS COMPOSED OF INORGANIC OXIDES MODIFIED WITH ORGANIC DYES

[75] Inventors: Kirsten Furhmann, Hanover; Alf-Eric Wischnat, Lehrte; Thomas Schulz, Bad Pyrmont; Michael Hoffmeister, Hanover, all of Germany

[73] Assignee: Engelhard Process Chemicals GmbH, Nienburg/Weser, Germany

[21] Appl. No.: 819,071

[22] Filed: Mar. 18, 1997

Related U.S. Application Data

[60] Continuation of Ser. No. 535,826, Sep. 28, 1995, abandoned, which is a division of Ser. No. 318,441, Oct. 5, 1994, Pat. No. 5,484,454.

[30] Foreign Application Priority Data

Oct. 14, 1993 [DE] Germany ............... 43 35 027.5

[51] Int. Cl.⁶ ............................................. B01D 53/28
[52] U.S. Cl. ........................... 95/117; 95/126; 55/275
[58] Field of Search ............... 55/274, 275; 95/117–126, 95/128, 900

[56] References Cited

U.S. PATENT DOCUMENTS

| | | | |
|---|---|---|---|
| 2,214,354 | 9/1940 | Snelling | 116/114 |
| 2,249,867 | 7/1941 | Snelling | 55/275 X |
| 2,526,938 | 10/1950 | Davis et al. | 55/275 X |
| 2,614,650 | 10/1952 | Chandler et al. | 55/275 X |
| 3,377,294 | 4/1968 | Davis et al. | 55/275 X |
| 3,477,866 | 11/1969 | Remer | 106/402 |
| 3,505,783 | 4/1970 | Graham | 55/275 X |
| 3,527,279 | 9/1970 | Knight et al. | 55/275 X |
| 3,620,677 | 11/1971 | Morison | 55/274 X |
| 3,643,402 | 2/1972 | Wireman | 55/275 X |
| 3,705,480 | 12/1972 | Wireman | 55/275 X |
| 3,716,388 | 2/1973 | Lopez et al. | 106/402 |
| 3,841,484 | 10/1974 | Domnick | 55/274 X |
| 4,167,422 | 9/1979 | Bellanca et al. | 106/402 |
| 4,530,706 | 7/1985 | Jones | 55/275 X |
| 4,756,726 | 7/1988 | Peace | 55/275 X |
| 4,769,079 | 9/1988 | Clark et al. | 106/402 |
| 4,795,556 | 1/1989 | Brotea et al. | 55/275 X |
| 4,955,995 | 9/1990 | Pontius | 55/274 X |
| 5,034,039 | 7/1991 | Goddard | 55/275 X |
| 5,074,917 | 12/1991 | Persello | 106/436 |
| 5,110,330 | 5/1992 | Loughran | 55/275 X |
| 5,484,454 | 1/1996 | Furhmann et al. | 95/117 X |

FOREIGN PATENT DOCUMENTS

| | | | |
|---|---|---|---|
| 1038015 | 9/1958 | Germany . | |
| 2917313 | 11/1980 | Germany . | |
| 3325753 | 1/1985 | Germany | 55/274 |
| 59-66324 | 8/1984 | Japan . | |
| 62-183834 | 8/1987 | Japan | 55/274 |

*Primary Examiner*—Robert Spitzer
*Attorney, Agent, or Firm*—Evenson, McKeown, Edwards & Lenahan P.L.L.C.

[57] ABSTRACT

Particulate adsorbents composed of inorganic oxides impregnated with an indicator dye selected from the group consisting of phenolphthalein, cresol red and thymol blue; a method for the production thereof, and a method for adsorptive drying of neutral gases using the aforementioned particulate adsorbents, whereby the degree of water absorption by the adsorbent particles is indicated by a reversible color change.

4 Claims, No Drawings

1

ADSORBENTS COMPOSED OF INORGANIC OXIDES MODIFIED WITH ORGANIC DYES

This application is a continuation of application Ser. No. 08/535,826 filed on Sep. 28, 1995, now abandoned, which is a division of parent application Ser. No. 08/318,441, filed Oct. 5,1994, now U.S. Pat. No. 5,484,454.

BACKGROUND OF THE INVENTION

The present invention relates to modified adsorbents composed of inorganic oxides, to a method for the production thereof, and to their use in methods for the adsorptive drying of neutral gases.

It is known to use particulate adsorbents composed of inorganic oxides, e.g. of silicon dioxide, aluminum oxide or aluminosilicate for drying gases. In addition to a high adsorption capacity for water vapor, the drying agents should be able to be regenerated again easily. To facilitate better monitoring of the drying process, it is desirable if the progressing water absorption of the adsorbents is indicated by a reversible color change thereof.

SUMMARY OF THE INVENTION

It is the object of the invention to provide novel adsorbents composed of inorganic oxides which indicate their degree of water absorption.

Another object of the invention was to provide a method for the adsorptive drying of neutral gases by means of adsorbents composed of inorganic oxides which indicate their degree of water absorption.

These and other objects of the invention are achieved by providing a particulate adsorbent comprising shaped bodies composed of an adsorbent inorganic oxide impregnated with an indicator dye selected from the group consisting of phenolphthalein, cresol red and thymol blue.

In accordance with a further aspect of the invention, the objects are achieved by providing a method for producing a particulate adsorbent, comprising impregnating shaped bodies composed of an adsorbent inorganic oxide with a solution comprising an indicator dye selected from the group consisting of phenolphthalein, cresol red and thymol blue, and thereafter drying the impregnated bodies.

DETAILED DESCRIPTION OF PREFERRED EMBODIMENTS

The invention thus relates to particulate adsorbents composed of inorganic oxides which are impregnated with a solution containing an indicator dye selected from the group consisting of phenolphthalein, cresol red and thymol blue.

As used herein, the phrase "adsorbents composed of inorganic oxides" is understood to refer to adsorbents comprising amorphous and/or crystalline silicon dioxide, aluminum oxide, aluminosilicate, magnesium oxide, zinc oxide, titanium dioxide, zirconium oxide or hafnium oxide. In addition to the actual oxidic constituents, they may additionally contain further additives which alter the use properties, e.g. fillers such as sheet silicates, zeolites, Aerosil™ or pore-formers such as wood flour or starch. In addition to the pure oxides, the term "inorganic oxides" is also to be understood to include mixed oxides, in particular binary or tertiary mixed oxides, one constituent of which is silicon oxide. Adsorbents according to the invention composed of silicon dioxide and/or aluminum oxide or aluminosilicate, in particular silicon dioxide, are particularly preferred.

The adsorbents according to the invention can be present as any type of particulate shaped bodies desired, e.g. as powder, granules, extrudates or bead-shaped shaped bodies. Advantageously, they are present as particles in a size of at least 0.1 mm. Particularly preferably, the adsorbents according to the invention are bead-shaped shaped bodies with an average grain size in the range from 0.1 to 6 mm, in particular 0.5 to 5 mm.

The adsorbents according to the invention are impregnated with an indicator dye selected from the group phenolphthalein, cresol red and thymol blue. This imparts to the adsorbents according to the invention the property of reacting reversibly with a color change upon contact with small quantities of water or water vapor. Owing to this property, the adsorbents according to the invention are suitable for adsorptive drying of moist gases. Adsorbents according to the invention impregnated with phenolphthalein show a color change from orange to colorless or orange to violet; adsorbents according to the invention impregnated with cresol red show a color change from orange to colorless, and adsorbents according to the invention impregnated with thymol blue show a color change from orange to blue. Depending on the indicator dye or dye content, the color change of the particles for a relative moisture content of the gas to be dried of between 10 and 50% becomes clearly visible. The adsorbed water can be removed again from the moisture-laden, color-changed adsorbents by heating to temperatures in the range of 80° to 200° C., whereupon they are regenerated and regain their original color.

Furthermore, the invention comprises a method for producing adsorbents in which shaped bodies composed of inorganic oxides are impregnated with a solution containing an indicator dye selected from the group phenolphthalein, cresol red and thymol blue and are then dried.

In the method according to the invention, crystalline or amorphous shaped bodies composed of silicon dioxide, aluminum oxide, aluminosilicate, magnesium oxide, zinc oxide, titanium dioxide, zirconium oxide or hafnium oxide may be used. Preferably shaped bodies composed of aluminosilicate, silicon dioxide and/or aluminum oxide are used. The production of such shaped bodies is generally known to a person skilled in the art. Crystalline aluminosilicate, for instance, can be produced in a manner analogous to the procedure described in German Examined Patent Application No. DE-AS 1,038,015. In this process, sodium aluminate solution and sodium silicate solution are mixed together, forming a gel, and are caused to crystallize. Amorphous aluminosilicates may be produced, for instance, in a manner analogous to the method described in published German Patent Application No. DE 2,917,313. In this case, an aluminate solution and a silicate solution are combined. If the mixture is poured immediately into a precipitating oil, bead-shaped bodies of amorphous aluminosilicate are formed.

In the method according to the invention, the shaped bodies composed of inorganic oxides may be used in any form desired, e.g. as granules, extrudates or as beads. Advantageously, the particles should have a size of at least 0.1 mm. Particularly preferably, bead-shaped shaped bodies with an average grain size in the range of 0.1 to 6 mm, in particular 0.5 to 5 mm, are used in the method according to the invention. However, other shapes of shaped bodies may also be used.

Preferably shaped bodies composed of aluminosilicate or silicon dioxide and/or aluminum oxide are used in the method according to the invention. Particularly preferably, colorless shaped bodies are used in the method according to the invention, which is particularly advantageous in facilitating later recognition of the color change of the adsorbents according to the invention. Such colorless shaped bodies can be obtained, for instance, by controlling the known production operation for the shaped bodies such that discoloration and clouding of the shaped bodies, e.g. by carbon-containing residues of added fillers or the forming oil used, are substantially avoided. Alternatively, the shaped bodies may optionally be subjected to a bleaching treatment, e.g. a treatment with ozone gas, after their production. The shaped bodies can be subjected to ozone treatment in a known manner, e.g. by pouring the shaped bodies into a receptacle and then passing ozone gas through this receptacle until the shaped bodies are visibly fully bleached. Shaped bodies which have been ozonized in this way are also generally commercially available, e.g. under the trade name "KC-Trockenperlen Type N™ ozonisiert".

The solution containing the indicator dye, with which the shaped bodies are impregnated in the method according to the invention, may be an aqueous solution or a solution which contains the indicator dye dissolved in a polar organic solvent such as acetone or a lower alcohol such as methanol or ethanol. The concentration of the indicator dye in the solution may range from about 0.01 to about 10% by weight, preferably 0.01 to 2% by weight. Preferably an aqueous solution is used. In this case, it is particularly advantageous if an aqueous solution containing the indicator dye which has been rendered alkaline by the addition of alkali carbonate or alkali hydroxide or alkaline earth hydroxide is used. Preferably the dye solution used for impregnation is added to alkali carbonate, in particular sodium carbonate, for this purpose. It is particularly advantageous to use the dye phenolphthalein in an aqueous solution rendered alkaline with sodium carbonate in the method according to the invention.

The method according to the invention for producing adsorbents is advantageously carried out by introducing the solution containing the dye and the shaped bodies together into a receptacle in approximately the same volume and allowing them to stand at room temperature for a residence time of 0.5 to 24 hours. Then the shaped bodies are filtered out of the impregnating solution by a filter or sieve, are rinsed, optionally several times, e.g. with water, and then are dried in a drying oven at a temperature of 80° to 200° C. Usually a drying time of about 8 to about 16 hours in the drying oven is sufficient for drying the adsorbents according to the invention.

The invention also relates to a method for adsorptive drying of neutral gases, in which the gases are brought into contact with the adsorbents according to the invention. The method according to the invention for drying neutral gases can be used in any fields of application in which moisture has to be removed from neutral gases by adsorptive drying, e.g. in synthesis gases, protective gases, factory compressed air of all types, conveying air, respiration air of transformers or compressed air for keeping shipping containers or storage containers dry. In addition to air in general, other neutral gases such as natural gas, nitrogen, oxygen, hydrogen, carbon dioxide and gaseous hydrocarbons such as acetylene, propane or butane and refrigerant gases composed of halogenated hydrocarbons can be dried adsorptively with the adsorbents according to the invention. Usually, the drying of the gases takes place such that the adsorbents according to the invention are poured into known adsorption systems, as are conventional in laboratories or industrial scale installations, e.g. test tubes, desiccators, drying towers, U-tubes, drying inserts in measuring instruments, transformers, air dehumidifiers or industrial scale adsorber-dryer installations, and then the gases to be dried are passed over or through the adsorbents according to the invention. With the method according to the invention, the quality of the drying can be readily monitored, since the color change indicates the point in time which makes regeneration of the adsorbents necessary. The adsorbents according to the invention are then regenerated by heating to temperatures of 80° to 200° C., whereupon they resume their original coloration. After regeneration, the adsorbents can be re-used for further adsorptive drying of neutral gases in the method according to the invention.

In addition to the adsorptive drying of neutral gases, the adsorbents according to the invention can also be used to detect alkaline or acidic constituents, e.a. to detect ammonia, in neutral gases owing to their indicator properties. Furthermore, they are also suitable for removing residual water from pre-dried organic solvents.

The following examples are intended to illustrate the invention in further detail without restricting its scope.

EXAMPLES

I. Production of adsorbents modified with a dye

The shaped bodies composed of silicon dioxide and aluminum oxide listed in the following Table 1, which are commercially available under their respective trade names, were used to produce adsorbents in accordance with the method of the invention.

For impregnation with the dye, a given volume of shaped bodies was poured at room temperature into a corresponding volume of impregnating solution placed in a beaker, and was allowed to stand for about 1 hour. Then the particles were filtered out of the solution by means of a sieve and were washed with distilled water until the filtrate was colorless. Then the resulting adsorbents according to the invention were dried for approximately 16 hours at approximately 150° C. in a drying oven. The compositions of the impregnating solutions containing the indicator dye, and the coloration of the resulting adsorbents produced according to the invention in the dry and wet states are listed in the following Table 1:

TABLE 1

| Adsorbents modified according to the invention | | | | |
|---|---|---|---|---|
| Example | | | Coloration | |
| No. | Shaped Body | Impregnation Solution | Dry | Moist |
| 1 | KC-Trockenperlen N ™ ozonisiert | 0.25% wt. phenolphthalein in ethanol | orange | colorless |
| 2 | KC-Trockenperlen | 0.25% wt. phenolphthalein | orange | colorless |

TABLE 1-continued

Adsorbents modified according to the invention

| Example No. | Shaped Body | Impregnation Solution | Coloration Dry | Moist |
|---|---|---|---|---|
|  | N ™ ozonisiert | 1.25% wt. sodium carbonate in water |  |  |
| 3 | KC-Trockenperlen N ™ ozonisiert | 0.75% wt. phenolphthalein 1.25% wt. sodium carbonate in water | orange | colorless |
| 4 | KC-Trockenperlen N ™ ozonisiert | 0.01% wt. cresol red in water | orange | colorless |
| 5 | KC-Trockenperlen N ™ ozonisiert | 0.01% wt. thymol blue in water | pink | colorless |
| 6 | KC-Trockenperlen N ™ ozonisiert | 0.05% wt. thymol blue 0.4% wt. sodium carbonate in water | orange | blue |
| 7 | KC-Trockenperlen AF25 ™ | 0.25% wt. phenolphthalein 1.25% wt. sodium carbonate in water | orange | colorless |
| 8 | KC-Trockenperlen N ™ ozonisiert | 0.7% wt. phenolphthalein 7.0% wt. sodium carbonate in water | orange | pink |
| 9 | KC-Trockenperlen N ™ ozonisiert | 1.1% wt. phenolphthalein 11.0% wt. sodium carbonate in water | orange | violet |
| 10 | Grace Type 175 ™ | 0.25% wt. phenolphthalein 2.5% wt. sodium carbonate in water | colorless | pink |
| 11 | KC-Trockenperlen WS ™ TM | 0.25% wt. phenolphthalein 1.25% wt. sodium carbonate in water | orange | white |

Behavior of the adsorbents of the invention upon adsorptive drying

To determine the color change point and the service life behavior of the adsorbents according to the invention, their equilibrium water vapor loading for air of different ure contents was measured isothermally at room temperature (25° C.). The measurements were performed in a known manner in accordance with German Industrial Standard DIN 55473, in that a defined air stream (approximately 4 dm³/min) was passed through 6 saturation flasks each filled with 1 dm³ of dilute sulfuric acid solution of given density in order to regulate the relative air humidity. This air stream was then passed through an adsorption vessel which contained predetermined amounts of adsorbents according to the invention. A sample of the adsorbents according to the invention was periodically taken from the adsorption vessel, and the water vapor adsorption capacity was determined from the increase in weight thereof. By way of example, the isothermal values for the adsorbents according to the invention of Examples No. 2 and No. 9 are illustrated in the following Table 2, with their isothermal adsorption capacity for water vapor being given as a relative increase in weight, relative to originally introduced weight of dry adsorbent.

TABLE 2 isothermal adsorption ability of the adsorbents according to the invention for water vapor

| Example No. | Relative moisture content of the air stream [%] | 10 | 20 | 40 | 60 | 80 |
|---|---|---|---|---|---|---|
| 2 | % by weight H₂O | 5.1 | 10.2 | 21.5 | 33 | 38.5 |
| 9 | % by weight H₂O | 3.2 | 4.9 | 8.9 | 19.5 | 34.4 |

A color change of the adsorbents according to the invention was achieved from a controlled relative moisture content of the air stream of about 10% and upwards with the adsorbent of Example No. 2 and from a controlled relative moisture content of about 50% and upwards with the adsorbent of Example No. 9. After drying in a drying oven at 150° C. for a period of approximately 16 hours, the adsorbents according to the invention reassumed the coloration given for the dry state.

In order to determine the service life, air-with a relative humidity of >10% was passed through the adsorbents according to the invention for 6 to 8 hours as described. The regeneration of the particles took place in the drying oven at 150° C. for 16 hours. This cycle was repeated several times in succession. By so doing, it was shown that the point of change and the loading capacity of the adsorbents according to the invention remained unchanged for all the adsorptive drying operations performed.

These results indicate that the discoloration of the adsorbents according to the invention takes place reversibly from the moist to the dry state, which makes them highly suitable for use in controlled adsorptive drying of neutral gases. The adsorbents according to the invention can then be reconverted back into their dry form by drying in a drying oven, in which case they resume their original color at the same time.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adsorptive drying of a neutral gas comprising contacting said neutral gas with a particulate adsorbent comprising shaped bodies produced by impregnating an adsorbent inorganic oxide selected from the group consisting of amorphous aluminosilicate and mixtures thereof with silicon dioxide with an aqueous solution consisting of water, an organic indicator dye selected from the group consisting of phenolphthalein, cresol red and thymol blue, and sufficient alkali carbonate to render the solution alkaline, and thereafter drying the impregnated bodies.

2. A method according to claim 1, wherein said indicator is phenolphthalein.

3. A method according to claim 1, wherein the impregnated adsorbent bodies change color at a relative moisture content of between 10 and 50 wt.-%.

4. A method according to claim 1, wherein said amorphous aluminosilicate comprises beads produced by combining an aluminate solution and a silicate solution to form a mixture, and pouring the mixture into a precipitating oil to form beads of amorphous aluminosilicate.

* * * * *